Feb. 23, 1932.   T. V. BUCKWALTER   1,846,836
ROLLER BEARING AND CAGE AND PROCESS OF ASSEMBLING SAME
Filed Dec. 10, 1930
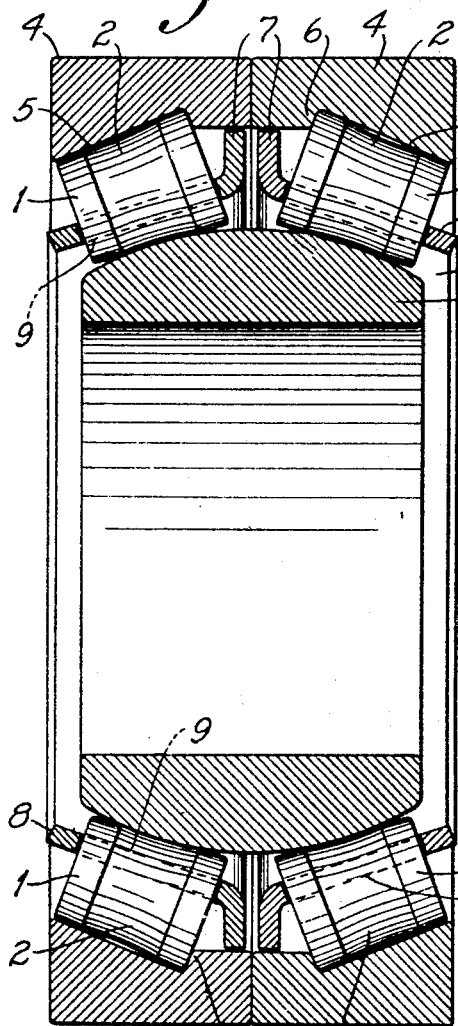
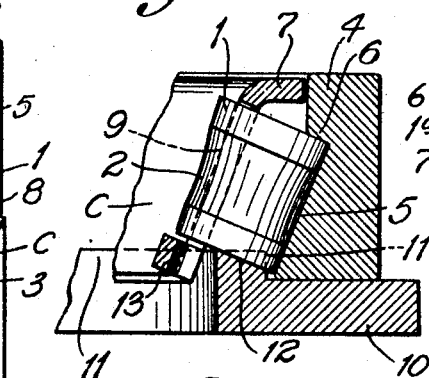
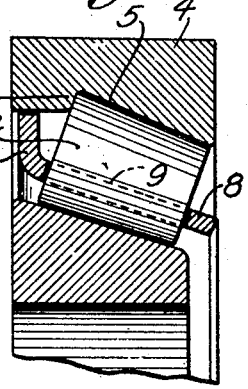
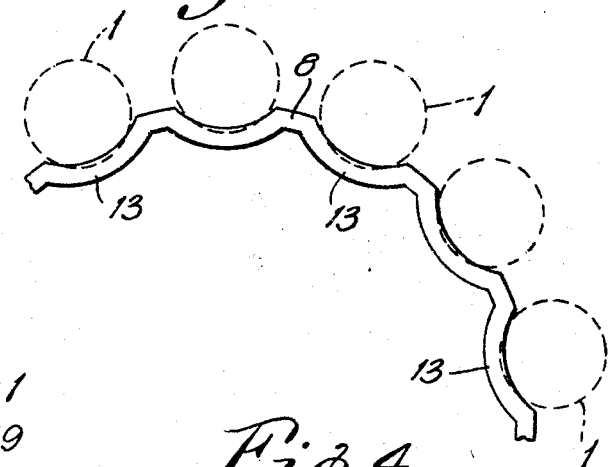
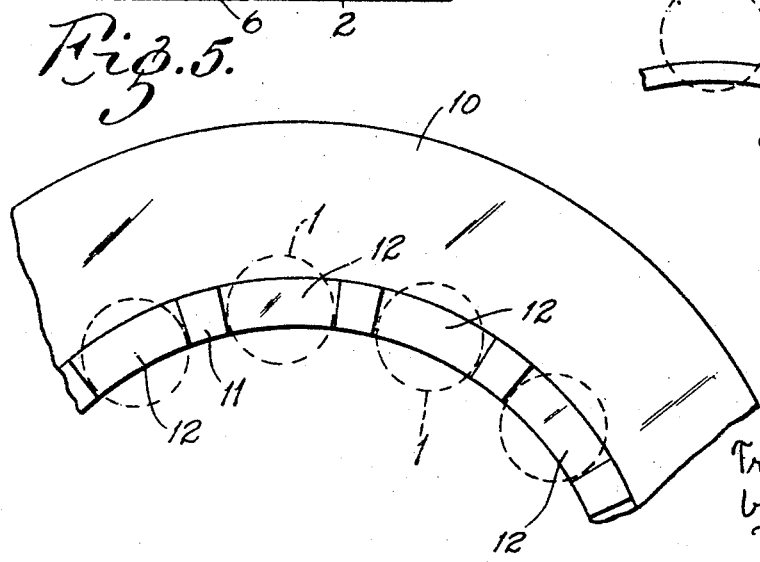
INVENTOR.
Tracy V. Buckwalter,
by Cann Kann & Gravely
HIS ATTORNEYS.

Patented Feb. 23, 1932

1,846,836

UNITED STATES PATENT OFFICE

TRACY V. BUCKWALTER, OF CANTON, OHIO, ASSIGNOR TO THE TIMKEN ROLLER BEARING COMPANY, OF CANTON, OHIO, A CORPORATION OF OHIO

ROLLER BEARING AND CAGE AND PROCESS OF ASSEMBLING SAME

Application filed December 10, 1930. Serial No. 501,202.

My invention relates to roller bearings, particularly conical roller bearings, to the cages for the rollers thereof and to the process of assembling the cage and rollers with one of the bearing members. A principal object of the invention is a cage that assists in maintaining lubricant at the large ends of the rollers, that does not churn up the oil in the bearing enclosure and that may be snapped over the rollers after they have been temporarily positioned, without risk of injuring said rollers. A further principal object is a bearing in which the thrust rib is on the outer member and which provides proper lubrication for said thrust rib. A further object is a process of assembling the rollers, cage and one bearing member which comprises positioning the rollers in proper spaced position, providing temporary means for holding them in position and then snapping the cage over the assembled rollers.

The invention further consists in the bearing and cage, and in the parts, combinations and arrangements of parts and in the assembling process hereinafter described and claimed.

In the accompanying drawings,

Fig. 1 is a longitudinal sectional view of a double row assembled bearing embodying my invention, Fig. 2 is a part sectional view of the bearing cup, rollers and cage, showing the annular assembling plate that holds the rollers in position before the cage is mounted thereon, Fig. 3 is a fragmentary view of the small end of the cage and rollers, showing the cage before shaping, Fig. 4 is a similar view after the final shaping of the cage, Fig. 5 is a fragmentary plan view of said assembling plate with the positions of rollers indicated in dotted lines; and Fig. 6 is a view of a single row bearing of the plain conical type.

In Fig. 1 is illustrated a bearing of the double row self-alining type in which the rollers 1 are of generally conical form, provided with concave middle portions 2 that engage a convexly curved inner bearing member 3 and in which the cup or outer bearing member 4 has a conical raceway 5 and a thrust rib 6 that engages the large ends of the rollers 1.

The cage C is of generally conical form and is arranged radially inward of the circle passing through the axes of the rollers, so as to make the rollers 1 and the bearing cup 4 a self-contained unit. The large end of the cage has an outturned annular flange 7 that fits closely in the cylindrical space formed by the thrust rib 6. The small end of the cage is an annular end ring 8. Bridges 9 form the body of the cage and space the rollers apart.

In the preferred process of mounting the rollers 1 in the cup 4, as shown in Fig. 2, an assembling plate 10 is disposed at the end of the bearing cup 4 and has an annular flange 11 projecting into the bore of the cup. Said flange 11 has beveled seats 12 in its face, said seats being spaced and located so as to give the rollers 1 the positions in the cup that they are to have in the assembled bearing. The small end ring of the cage is crimped inwardly, as indicated at 13, to provide a depression or corrugation corresponding to each roller; and the cage is then inserted into the assembled series of rollers, said crimped ends 13 snapping over the small ends of the rollers. The end ring 8 is then restored by any suitable mechanism to circular form.

As illustrated in Fig. 6, the cage is equally adaptable for use with rollers 1a of true conical form.

The above described construction and assembling process has numerous advantages. The assembling process avoids the risk of scraping, Brinelling or defacing the rollers that is inherent in the usual process of snapping the cage and rollers over the hardened rib of a bearing member. The large end ring of the cage, fitting closely in the circle of the thrust rib, maintains lubricant at the large ends of the rollers and on the thrust rib; and it also relieves the rollers from the load of the cage after wear takes place. Churning up of the lubricant is reduced to a minimum by reason of the large end of the cage not dipping into the lubricant and the small end thereof being of circular form, free from projecting or corrugated portions.

What I claim is:

1. The process of assembling conical rollers and a cage with a bearing cup having a conical raceway and a thrust rib at the end thereof, which includes disposing at the end of said bearing cup opposite said thrust rib, an assembling plate having a flange projecting into the bore of said cup, said flange being beveled toward the raceway of said cup, mounting said rollers on said flange, and inserting the cage into said rollers.

2. The process of assembling conical rollers and a cage with a bearing cup having a conical raceway and a thrust rib at the end thereof, which includes disposing at the end of said bearing cup opposite said thrust rib, an assembling plate having a flange projecting into the bore of said cup, said flange having spaced seats beveled toward the raceway of said cup, mounting rollers on said seats and inserting the cage into said rollers.

3. The process of assembling conical rollers and a cage having a small end ring with a bearing cup having a conical raceway and a thrust rib at the end thereof, which includes disposing at the end of said bearing cup opposite said thrust rib, an assembling plate having a flange projecting into the bore of said cup, said flange having spaced seats beveled toward the raceway of said cup, mounting rollers on said seats, inserting into said rollers a cage having its small end ring crimped to conform to said rollers and restoring said end ring to circular form.

Signed at Canton, Ohio, this 1st day of Dec., 1930.

TRACY V. BUCKWALTER.